United States Patent [19]
Manoogian

[11] Patent Number: 5,620,022
[45] Date of Patent: Apr. 15, 1997

[54] SEISMIC GAS SHUT-OFF VALVE WITH SAFETY LOCK

[75] Inventor: Ara K. Manoogian, Burbank, Calif.

[73] Assignee: Khachig Evan Manoogian, Burbank, Calif.

[21] Appl. No.: 571,356

[22] Filed: Dec. 13, 1995

[51] Int. Cl.⁶ ............................................. F16K 17/36
[52] U.S. Cl. ........................... 137/383; 137/38; 137/39; 70/180; 251/292
[58] Field of Search ........................... 137/38, 39, 460, 137/461, 498, 383, 382, 382.5; 70/180; 251/291, 292, 90

[56] References Cited

U.S. PATENT DOCUMENTS

| | | | |
|---|---|---|---|
| D. 248,613 | 7/1978 | Pace et al. | D8/17 |
| D. 267,392 | 12/1982 | Hildebrant | D8/28 |
| D. 268,086 | 3/1983 | Waters, Jr. | D8/17 |
| D. 268,087 | 3/1983 | Truefitt | D8/28 |
| D. 282,046 | 1/1986 | Dumond et al. | D8/21 |
| D. 300,000 | 2/1989 | Reinhardt | D8/14 |
| D. 301,010 | 5/1989 | Renna | D8/17 |
| D. 333,243 | 2/1993 | Brown | D8/17 |
| D. 344,437 | 2/1994 | Cleland et al. | D8/21 |
| D. 353,755 | 12/1994 | Lane | D8/17 |
| 1,432,621 | 10/1922 | Rath | 70/180 |
| 3,747,616 | 7/1973 | Lloyd | 137/38 |
| 4,331,171 | 5/1982 | Novi | 137/45 |
| 4,485,832 | 12/1984 | Plemmons et al. | 137/38 |
| 4,715,394 | 12/1987 | O'Donnell et al. | 137/38 |
| 4,799,505 | 1/1989 | Nowell | 137/38 |
| 4,889,150 | 12/1989 | Lloyd et al. | 137/39 |
| 4,959,980 | 10/1990 | Phillips | 70/180 |
| 5,074,327 | 12/1991 | Reid | 137/38 |
| 5,139,041 | 8/1992 | Albrecht | 137/385 |
| 5,143,110 | 9/1992 | Simpson | 137/38 |
| 5,143,114 | 9/1992 | Doniels | 137/382 |
| 5,165,263 | 11/1992 | Perron et al. | 70/177 |
| 5,190,070 | 3/1993 | Robinson | 137/385 |
| 5,199,286 | 4/1993 | Jakubas | 70/230 |
| 5,209,252 | 5/1993 | Perle | 137/38 |
| 5,234,029 | 8/1993 | Thomas et al. | 137/382 |
| 5,299,597 | 4/1994 | Fort et al. | 137/385 |
| 5,353,833 | 10/1994 | Martinez | 137/385 |
| 5,360,036 | 11/1994 | Kieper | 137/315 |
| 5,365,759 | 11/1994 | Bonomi | 70/177 |
| 5,415,017 | 5/1995 | Benda et al. | |
| 5,427,135 | 6/1995 | Kieper | 137/385 |
| 5,456,278 | 10/1995 | Morris et al. | 251/292 |

*Primary Examiner*—A. Michael Chambers
*Attorney, Agent, or Firm*—Elliott N. Kramsky

[57] ABSTRACT

A seismic gas shut-off valve includes a lock to control resetting after a seismic event. The valve includes internal first and second seats for a ball vale in which the first seat is elevated above the second seat and the second seat lies within the flow of gas from a supply line to a distribution line. A horizontal shaft is extendible within the valve body to reposition the ball valve from the lower second seat to the upper first seat after valve actuation. A lock comprising an integral three-sided bracket and padlock is selectively engaged to the reset shaft to prevent premature and unsafe resetting or "opening" of the valve after an earthquake. In an alternative embodiment, the bracket includes an elongated wing element that includes an aperture. The alternative embodiment is suitable for use as a wrench to operate the main gas shut-off of a residence or other building.

9 Claims, 3 Drawing Sheets

5,620,022

SEISMIC GAS SHUT-OFF VALVE WITH SAFETY LOCK

BACKGROUND

1. Field of the Invention

The present invention relates to apparatus for preventing premature turn-on of gas after seismic activity. More particularly, this invention pertains to a seismically-activated gas shut-off valve that includes a reset safety lock.

2. Description of the Prior Art

Many structures, both residential and otherwise, are located in areas subject to substantial earthquake activity. The vast majority of such structures include a natural or liquid petroleum gas supply system to run appliances for needs as basic and diverse as cooking and hygiene.

The usual arrangement for supplying gas to a structure from a remote source of natural gas or liquid petroleum gas includes a pressure regulator within a gas main. The pressure regulator serves to modify the gas pressure from its supply or storage level (about 160 p.s.i. for liquid petroleum sources of butane and propane) to a reduced level suitable for use by domestic appliances (about 0.5 p.s.i.). The low pressure is run through a gas meter whose output is, in turn, coupled to a service line for supplying the various appliances within the dwelling.

Shutting off the gas supply to a structure subjected to significant seismic forces is essential to prevent leakage from broken lines. A useful addition to the basic gas supply system described above in areas subject to earthquake-induced lateral acceleration and deceleration forces is a valve within the service pipe whose closure is responsive to such lateral forces. Examples of such valves are disclosed in U.S. Pat. No. 3,747,616 of Hershall E. Lloyd entitled "Earthquake Sensitive Shut-Off Valve" and U.S. Pat. No. 4,889,150 of Hershall E. Lloyd et al. entitled "Pressure Control For Earthquake Sensitive Shut-Off Valve". Each teaches a valve housing that accommodates substantially-vertical internal gas flow channel. A ball valve of a heavy metal fabrication within the valve housing is movable from a first stable position seated upon a saddle de-centered from the vertical flow channel (valve "open") to a second stable position, a valve seat that lies within the flow channel (valve "closed"). The internal structures of the valves are arranged so that the ball valve will tumble from the elevated saddle to the valve seat, causing the flow of gas to be interrupted, in response to earthquake forces.

Once the flow of gas has been interrupted and seismic activity ended, careful inspection must be made of vulnerable structures, such as gas lines, to ascertain their integrity. Leaks create numerous problems after an earthquake as a result of the volatility and toxicity of both natural and petroleum gases. U.S. Pat. No. 4,889,150 teaches a useful arrangement that permits reopening of the gas flow channel in a sealed valve after the valve has been actuated to its closed position. This is accomplished by a means of a horizontally-disposed push pin that is located within a cage at a side of the valve housing opposite the aforesaid saddle. The push pin or piston is fixed to a handle and the unit is slidable within the cage. An aperture in the side of the valve body admits the push pin for contacting the ball valve at such a level that it exerts a horizontal repositioning force, lifting the ball valve from the valve seat onto the elevated saddle. The resetting arrangement is spring-loaded within the cage for automatic retraction when the valve is in its open position.

Ideally, a careful inspection is made of vulnerable structures subsequent to a seismic event. Unfortunately, this does not always take place due to the vulnerability of the valve to unintentional resetting scenarios. The valve is usually installed at a level that is easily-accessible and this can present an irresistible temptation to reset after a period of time has passed without a home supply of gas. Restarting the flow of gas without proper inspection can produce disasters. The relatively low level of installation also subjects the valve to inadvertent resetting by pets and children.

SUMMARY OF THE INVENTION

The present invention addresses the preceding and other shortcomings of the prior art by providing, in a first aspect, a seismic gas shut-off valve. The valve includes a valve housing adapted to receive a gas supply line and to be coupled to a gas distribution line. The valve body includes an internal chamber for gas flow between the supply line and the distribution line.

A ball valve is located within the valve housing. The valve housing includes a saddle and a valve seat adapted to receive the ball valve. The valve is arranged so that, when the ball valve is at the saddle, gas flow can occur between the supply and distribution lines and, when the ball valve is located at the valve seat, no flow can occur.

The saddle is elevated above the valve seat whereby the ball valve can be repositioned, under the force of gravity, from the saddle to the valve seat in response to predetermined lateral acceleration of the valve. Means are provided for resetting the ball valve from the valve seat to the saddle. Such means comprises a substantial horizontal push pin.

A handle is provided at a first end of the push pin arranged transverse thereto. A cage for housing the push pin has a lateral slot whereby the push pin can be selectively advanced and withdrawn from the interior of the valve housing. The push pin is so located that the opposed end of the push pin may be advanced to cause the ball valve to move from the valve seat to the saddle. Means are provided for selectively preventing actuation of the push pin.

In a second aspect, this invention provides a lock. The lock includes a bracket comprising an integral member of two planar wings with a planar central spacer therebetween. Each wing has at least one aperture. A lock of the type that includes a lock body and a shackle is provided. One aperture of each wing is mutually aligned to receive the shackle.

The preceding and other features and advantages of the present invention will be further appreciated from the detailed description that follows. Such detailed description is accompanied by a set of drawing figures. Numerals of the drawing figures, corresponding to those of a written description, point to the various features of the invention. Like numerals refer to like features throughout the both the written description and the drawing figures.

DETAILED DESCRIPTION OF THE PREFERRED EMBODIMENT

Figure 1:
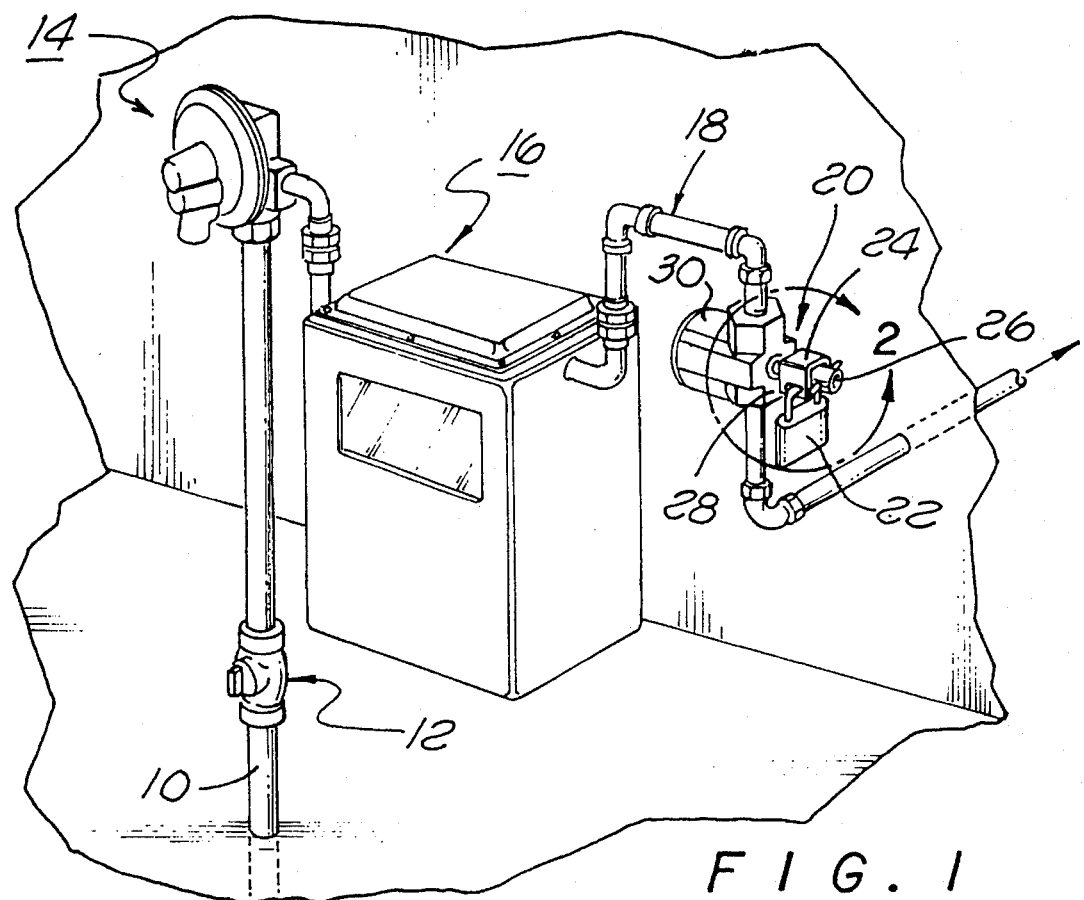
FIG. 1 is a perspective view of a gas meter installation including an earthquake shut-off valve and lock in accordance with the invention.

Turning to the drawings, FIG. 1 is a perspective view of a gas meter installation including an earthquake shut-off valve and lock in accordance with the invention. As can be seen, either natural or liquid petroleum gas under high pressure is provided through a delivery line 10. A plug cock 12 within the delivery line 10 that includes an internal ball valve serves as a manually-operable shut-off that is particularly useful in situations requiring interruption of gas supply due to conditions that fail to trigger the seismic shut-off valve (discussed below).

A pressure regulator 14 is located within the delivery line 10. As mentioned previously, the pressure regulator 14 reduces the pressure of the flowing gas to a level that is amenable to the operation of domestic appliances and the like. A gas meter 16 is coupled to the delivery line 10 to receive the low pressure gas output of the pressure regulator 14. The output side of the meter 16 is coupled to a customer service line 18. A seismic-sensitive shut-off valve 20 is located within the service line 18 downstream of the meter 16. Such valve is generally in accordance with U.S. Pat. No. 4,889,150 supra.

Figure 2:
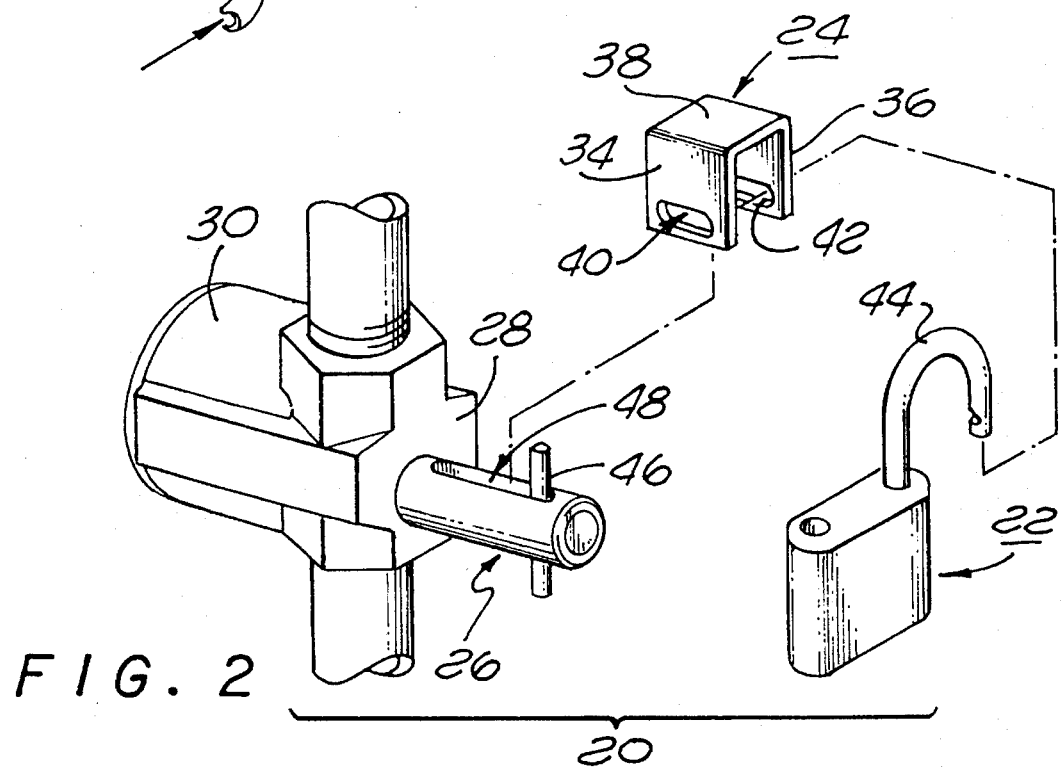
FIG. 2 is an exploded perspective view of the elements of the invention taken at 2—2 of FIG. 1.

Referring to FIG. 1 in combination with FIG. 2, an exploded perspective view of the elements of the invention taken at 2—2 of FIG. 1, it can be seen that a padlock 22 is engaged to a bracket 24 which surrounds an elongated cage 26 that forms a portion of the valve 20. The cage 26 is fixed to a vertical wall 28 of the valve housing 30. As disclosed in U.S. Pat. No. 4,889,150, the cage 26 houses a manually-operable push-pin or piston for resetting the earthquake-sensitive valve 20 from closed to open operation after activation. The bracket 24 is generally U-shaped including opposed wings 34, 36 adjoined to and integral with a central spacer 38. Slots 40, 42 are provided in the wings 34, 26 respectively for receiving the shackle 44 of the padlock 22.

The bracket 24-and-lock 22 cooperatively act to limit the extent of leftward travel of a handle 46 within a longitudinal slot 48. In so doing, unintended and/or premature resetting of the earthquake sensitive valve 20, whether by humans or animals, is prevented. Rather, the bracket-and-lock arrangement must be purposely removed by a presumably-responsible and qualified individual before the valve 20 is reset and gas flow resumed.

Figure 3:
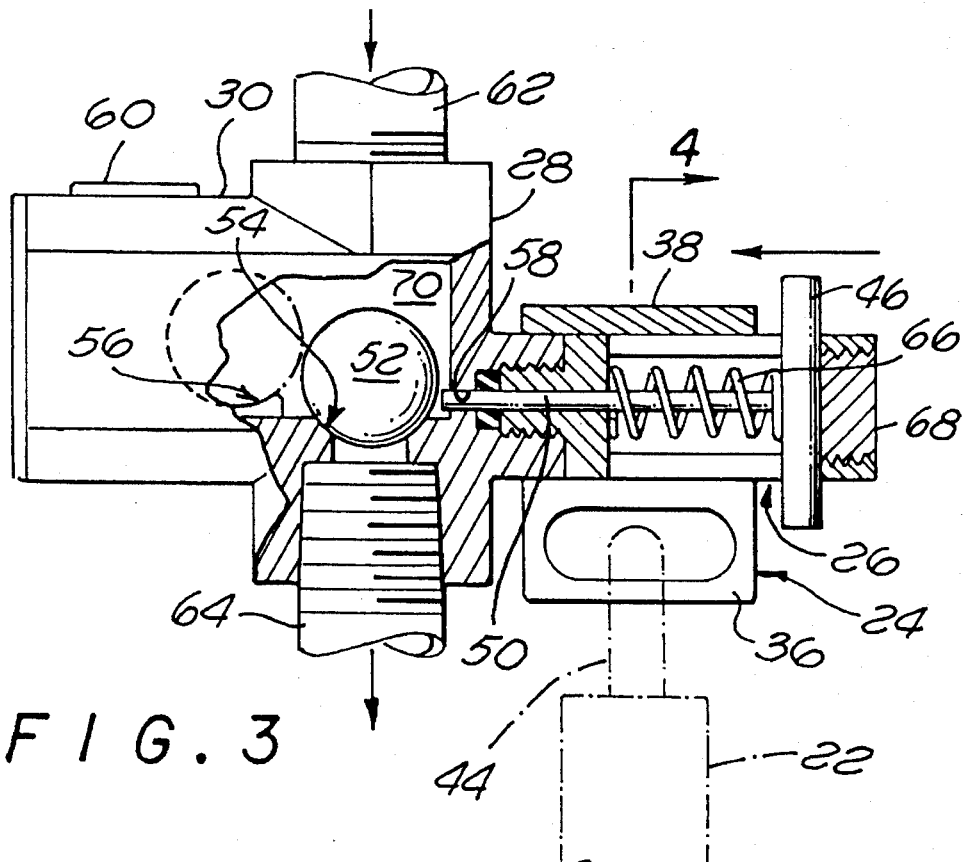
FIG. 3 is a longitudinal sectional view of the earthquake shut-off valve with locking arrangement according to the invention.

FIG. 3 is a longitudinal sectional view of the earthquake shut-off valve 20 with locking arrangement as described above. The push pin 50 can be clearly seen in this view. As mentioned earlier, the push pin 50 is fixed to the handle 46 for manual actuation to replace a ball valve 52 from a valve seat 54 (flow closure position) to an elevated saddle 56 (open position). An aperture 58 within the valve housing 30 admits the push pin 50 at an appropriate level for accomplishing the desired resetting.

The details of the earthquake sensitive shutoff valve 20 are discussed with reference to the present invention only insofar as essential to comprehension thereof. Briefly, a level 60 is affixed to the valve housing 30 to permit installation of the valve 20 within the supply line 18 in such a way that the flow of gas occurs in a downward substantially-vertical direction from an input coupling 62 to an output coupling 64, such couplings engaging the valve 20 to the supply line 18 as illustrated in FIG. 1. Although not essential to comprehension of the present invention, it may be mentioned that a variable-pitch ramp may be provided to adjust the valve to tumble in accordance with a predetermined threshold force. A spring 66 within the cage 26 urges the handle 46 rightwardly whereby it is normally seated against an end plug 68.

Figure 4:
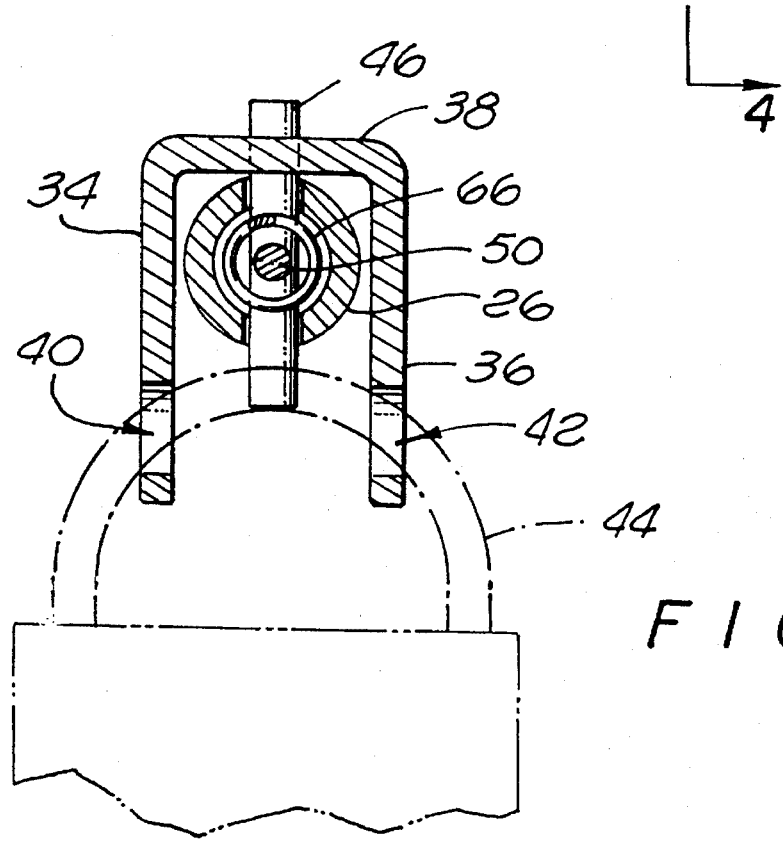
FIG. 4 is a sectional view of the invention taken at 4—4 of FIG. 3.

FIG. 4 is a sectional view of the invention taken at 4—4 of FIG. 3. As can been seen, the bracket 24-and-lock 22 arrangement surrounds the cage 26 when affixed to the valve 20. Referring to FIGS. 3 and 4 in combination, it is noted that the bracket 24 need not extend the entire distance between the wall 28 of the housing 30 and the handle 46 to effectively prevent resetting of the valve 20 from its closed to its open position. Rather, it need only prevent the push pin 50 from extending sufficiently within the interior 70 of the housing 30 to elevate the ball valve 52 onto the seat 56. Even if some displacement of the ball valve 52 from the valve seat 54 can result from a leftward push upon the handle 46, the spring 66 will quickly return the pin 50 to the position illustrated in FIG. 3 and the ball valve 52, which is fabricated of a heavy metal, will resettle onto the valve seat 54, blocking flow.

Figure 5:
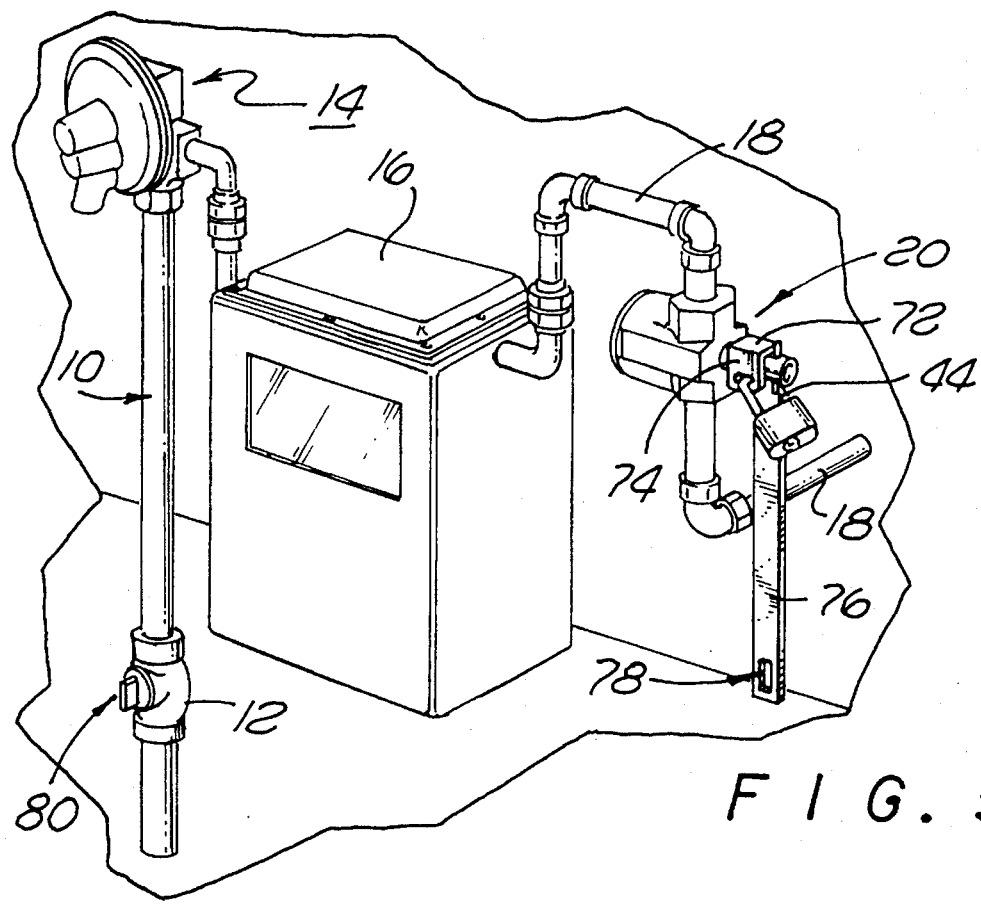
FIG. 5 is a perspective view similar to that of FIG. 1 incorporating a combined valve lock and wrench arrangement in accordance with an alternative embodiment of the invention.

FIG. 5 is a perspective view similar to that of FIG. 1 incorporating a combined valve and wrench arrangement in accordance with an alternative embodiment of the invention. The lock 22-and-bracket 72 arrangement of this figure differs from that of the prior embodiment in that the bracket 72 comprises a non-symmetrical arrangement whereby opposed wings 74 and 76 are of differing lengths. As will be seen, the elongated wing 76 includes a slotted aperture 72 in addition to and spaced from an upper slotted aperture for receiving the shackle 44 of the lock 22. The slotted aperture 78 is compatible with the geometry of a pin 80 for controlling the plug cock 12 for manual gas shut-off.

Figure 6:
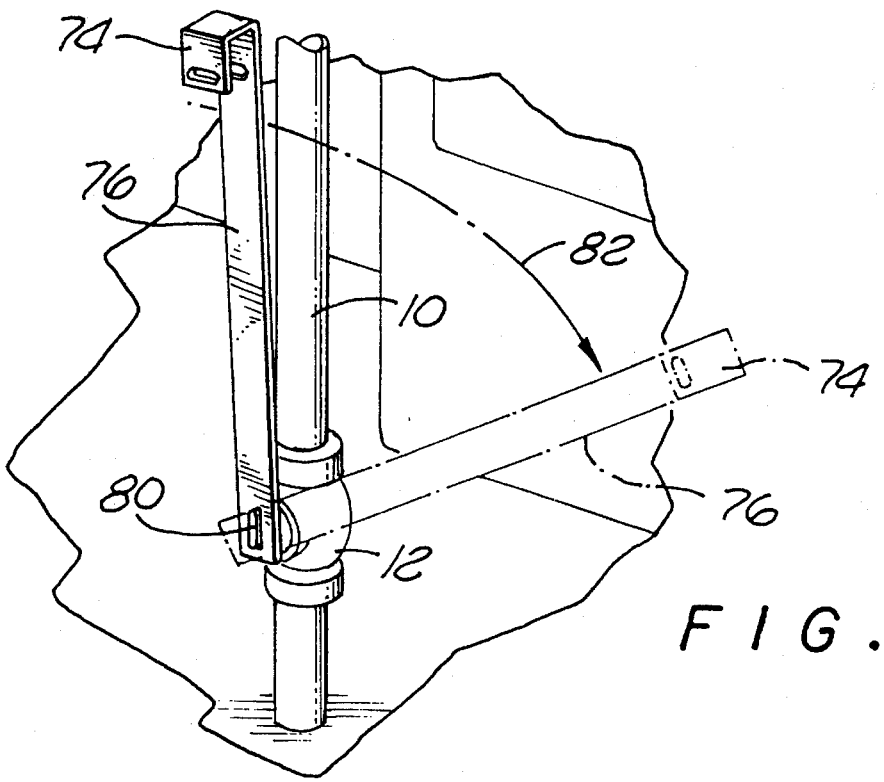
FIG. 6 is a perspective view for illustrating the manner of use of the combined lock and wrench embodiment of the invention for closing the main gas delivery line of a residence or other building.

FIG. 6 is a perspective view for illustrating the manner of use of the combined lock and wrench embodiment of the invention for closing the main gas delivery line of a residence or other building. As can be seen, the bracket 72 may be temporarily removed from engagement to the earthquake sensitive valve 20 by first unlocking the padlock 22. Once this has been accomplished, the user possesses an essential tool for turning off the supply of gas. As can be seen, the gas supply may be shut off manually by first engaging the slotted aperture 78 to the plug cock 12 as shown, then rotating it through an appropriate angular displacement 82 to achieve closure. The elongated length of the wing 76 facilitates such closure by offering significant leverage for turning the plug cock 12. The alternative embodiment is especially useful insofar as it assures that the user will have an appropriate tool for emergency use that is reliably positioned adjacent the plug cock 12. This may prevent disaster since a panicked resident may otherwise experience great difficulty in locating an appropriate tool. By keeping the key (or combination) to the padlock in an always-accessible location, the resident is assured of the capability of prompt response to emergency situations.

While this invention has been described with reference to its present preferred embodiment, it is not limited thereto.

Rather, this invention is limited only insofar as it is defined by the following set of patent claims and includes within its scope all equivalents thereof.

What is claimed is:

1. A lock comprising, in combination:

a) a bracket, said bracket comprising an integral member comprising two planar wings of unequal heights and a planar central spacer therebetween;

b) each of said wings having at least one transversely elongated aperture;

c) a lock of the type that includes a lock body and a shackle;

d) one aperture of each wing being mutually aligned to receive said shackle; and e) the longer of said wings has an aperture within the region exceeding the height of the other wing for engaging a valve.

2. A lock as defined in claim 1 wherein said aperture for engaging a valve comprises a vertical slot.

3. A seismic gas shut-off valve comprising, in combination:

a) a valve housing adapted to receive a gas supply line and to be coupled to a gas distribution line;

b) said valve housing including an internal chamber for gas flow between said supply line and said distribution line;

c) a ball valve within said housing;

d) said housing including a saddle and a valve seat adapted to receive said ball valve;

e) said valve being arranged so that, when said ball valve is at said saddle gas flow can occur between said supply and distribution lines and, when said ball valve is at said seat, no flow of gas can occur therebetween;

f) said saddle being elevated above said valve seat whereby said ball valve can be repositioned, under the force of gravity, from said saddle to said valve seat in response to predetermined lateral acceleration of said valve;

g) means for resetting said ball valve from said valve seat to said saddle;

h) said means comprising a substantially horizontal elongated push pin;

i) a handle at a first end of said push pin arranged transverse to said elongated push pin;

j) a cage for housing said push pin, said cage having a lateral slot whereby said push pin can be selectively advanced and withdrawn from the interior of said housing;

k) said push pin being so located that the opposed end of said push pin may be advanced to cause said ball valve to move from said valve seat to said saddle; and l) means for selectively preventing actuation of said push pin, said means comprising a bracket and a lock of the type that includes a lock body and shackle.

4. A seismic gas shut-off valve as defined in claim 3 wherein said bracket further comprises:

a) an integral member comprising two planar wings and a planar central spacer therebetween;

b) each of said wings having at least one aperture; and c) one aperture of each wing being mutually aligned to receive said shackle.

5. A seismic gas shut-off valve as defined in claim 4 wherein the length of said member is less than the distance between said valve body and said handle.

6. A seismic gas shut-off valve as defined in claim 5 wherein said aperture is transversely elongated for receiving said shackle.

7. A seismic gas shut-off valve as defined in claim 5 wherein said wings are of equal height.

8. A seismic gas shut-off valve as defined in claim 5 wherein:

a) the height of a first wing exceeds that of the other wing; and b) said first wing has an aperture for engaging a manual gas shut-off.

9. A seismic gas shut-off valve as defined in claim 8 wherein said aperture for engaging a manual gas shut-off comprises a vertical slot.

* * * * *